United States Patent [19]
Barnett

[11] Patent Number: 4,750,767
[45] Date of Patent: Jun. 14, 1988

[54] AUTOMOBILE SIDE PROTECTOR

[76] Inventor: John L. Barnett, 23812 Country View Dr., Diamond Bar, Calif. 91765

[21] Appl. No.: 28,391

[22] Filed: Mar. 20, 1987

Related U.S. Application Data

[63] Continuation-in-part of Ser. No. 946,853, Dec. 29, 1986, Pat. No. 4,707,009.

[51] Int. Cl.⁴ ............................................. B60J 11/00
[52] U.S. Cl. ..................................... 293/128; 280/770
[58] Field of Search ...................... 293/128; 280/770; 296/136

[56] References Cited

U.S. PATENT DOCUMENTS 4,014,583  3/1977  Forbes .................................. 293/128
4,355,839  10/1982  Rosen ................................... 296/136

*Primary Examiner*—Robert R. Song
*Attorney, Agent, or Firm*—Edgar W. Averill, Jr.

[57] ABSTRACT

An automobile side protector for guarding one side of an automobile against dents and scratches from adjacent automobile doors and other sources. The protector has a support band with a thickened portion at the top and a protective pad at the other end. The support band is inserted at the top of an automobile door and the protective pad hangs downwardly and outwardly along the side of the car to be protected.

7 Claims, 1 Drawing Sheet

AUTOMOBILE SIDE PROTECTOR

BACKGROUND OF THE INVENTION

The field of the invention is automotive parts and the invention relates more particularly to devices for protecting the sides of automobiles against dents and scratches of the type typically occurring in parking lots.

Numerous approaches have been taken to protect automotive sides. One such device is shown in U.S. Pat. No. 4,014,583 where a pair of straps are hooked to the automobile window and hold a protective pad against the side of an automobile by magnets or other means. Because the device is held at only two points and a significant amount of weight must be supported by a small part of the automobile window or special hooks must be installed above the car door. A car body guard is shown in U.S. Pat. No. 4,493,502 which utilizes a flexible strap which is retracted into a holder held in the automobile wheel well. A strap, however, protects only a small portion of the automobile side. An upwardly extendable pad is shown in U.S. Pat. No. 3,563,594 and the pad is rolled upwardly from a holder held under the rocker panel of the car. This device, however, would appear to detract from the appearance of the automobile since it visibly extends below the rocker panel. Also, it is exposed to mud, water and other elements which could tend to scratch the side of the automobile once the pad was unrolled. Another retractable protector is shown in U.S. Pat. No. 3,540,773 where the shield is unfolded from the center gap between the front and back door of the vehicle. This device would appear usable only with a very limited design of four-door automobiles. A pad supported by the vehicle door lock is shown in U.S. Pat. No. 3,704,037 but it appears to provide very limited protection. A vehicle car door protection system is also shown in U.S. Pat. No. 4,530,519 and the device is unrolled upwardly from a holder held below the automobile door. It would appear that the device would have to be added at the factory or otherwise inserted below the surface of the rocker panel. A plastic pad to protect the side of pickup trucks is shown in U.S. Pat. No. 4,531,560 and the pads are held to the vehicle by magnets. This approach would appear impractical, however, for protecting car door sides in parking lots since it could be readily removed by anyone and, thus, becomes an easy target for theft.

There is, thus, a need for a protector which protects one side of a vehicle, can be securely held to the vehicle when the vehicle is locked and which can be readily applied and easily folded when not in use.

SUMMARY OF THE INVENTION

The present invention is for an automobile side protector for guarding one side of an automobile against dents and scratches from adjacent automobile doors and other sources. The protector comprises a support band having a first end and a second end and having dowel means held at the first end thereof. The dowel means comprises a generally cylindrical member held by the support band. At least one protective pad is held at the second end of the support band so that when said dowel means is positioned at the top of an automobile door and window, that the protective pad is extendable downwardly a sufficient distance to extend about to the rocker panel of the automobile to be protected and said protective pad extends forwardly and rearwardly away from said support band. Preferably, the protective pad has a forwardly foldable pad section and a rearwardly foldable pad section. The present invention also includes the method of using the pad of the present invention where the pad assembly is placed on the top of the automobile and the dowel means of the support band is extended over the edge of the open door. The door is next closed on the dowel means, capturing it, and the pad is then unfolded downwardly and outwardly against the side of the automobile. The dowel means may be a wooden dowel or a rope or other thickened object, preferably sewn within the support band.

DESCRIPTION OF THE PREFERRED EMBODIMENTS

Figure 1:
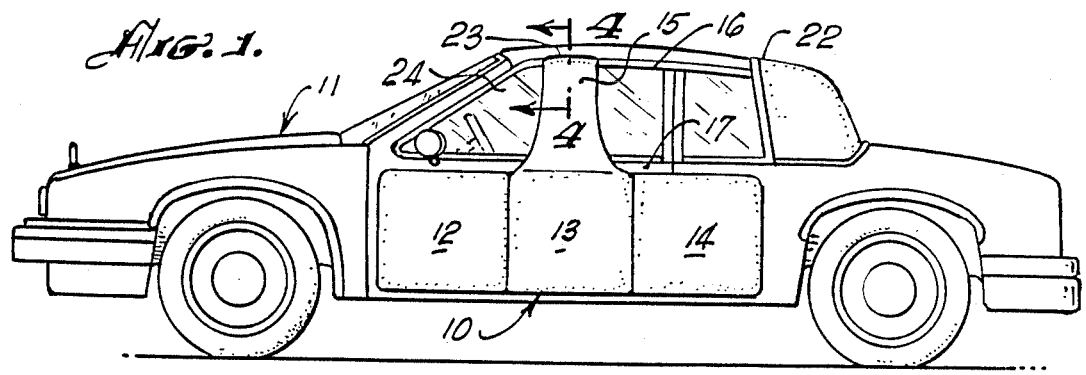
FIG. 1 is a side view of an automobile protected by the protective pad of the present invention.

The protective pad 10 of the present invention is shown placed over one side of automobile 11. Protective pad 10 has a forwardly extending pad 12, a center pad 13 and a rearwardly extending pad 14. Pads 12, 13 and 14 are held by a downwardly extending support band 15 which is held at the top 16 of automobile door 17.

Figure 2:
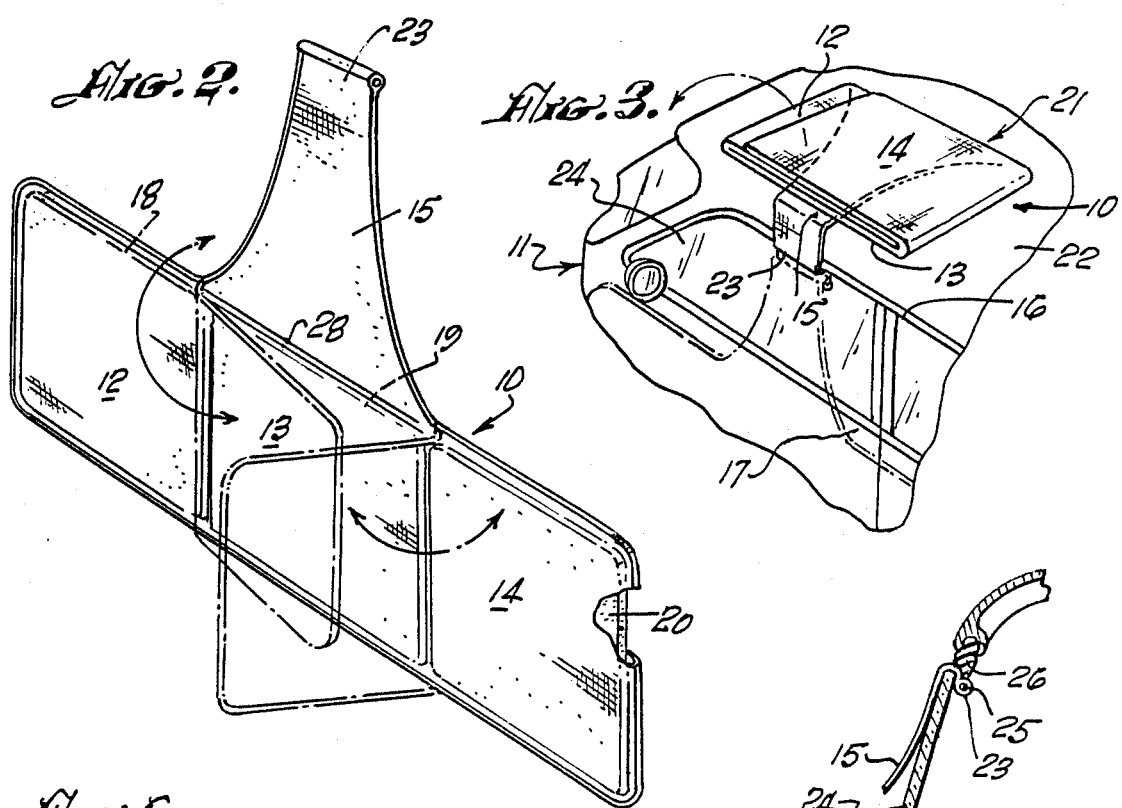
FIG. 2 is a perspective view of the protective pad of FIG. 1.

The protective pad 10 is shown in perspective view in FIG. 2 where it can be seen that the pad is fabricated from a fabric envelope which contains three foam pads 18, 19 and 20. The envelope is preferably fabricated from canvas or relatively heavy fabric having excellent sunlight resistance. The pad should be relatively lightweight and foam rubber or polyurethane foam pads of a thickness of about one-half inch have proved sufficient to provide protection from impact of adjacent car doors which are the most common cause of side dents.

Figure 3:
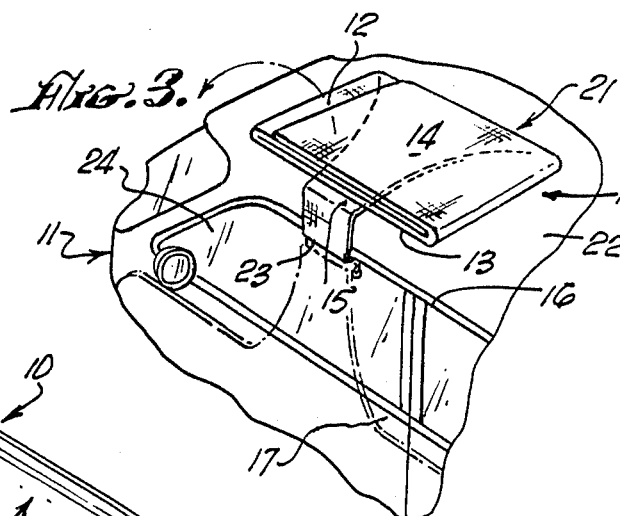
FIG. 3 is a perspective view showing the pad assembly prior to being unfolded against the side of the automobile.
Figure 6:
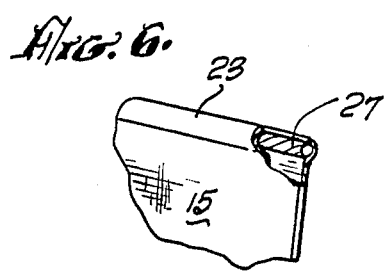
FIG. 6 is an enlarged view of the dowel means, partly cut away of the protective pad of FIG. 1.
Figures 4, 5:
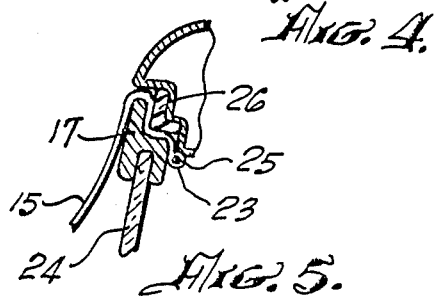
FIG. 4 is a cross-sectional view taken along line 4—4 of FIG. 1.
FIG. 5 is a cross-sectional view similar to FIG. 4 but showing a different style of automobile door.
Figure 7:
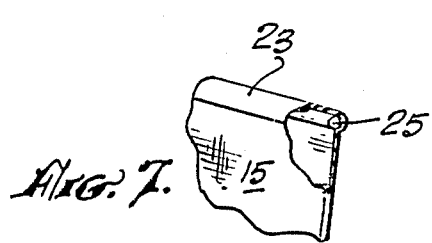
FIG. 7 is a view analogous to FIG. 6 showing a different style of dowel means.

The pad assembly which is shown in a generally folded configuration in FIG. 3, and indicated by reference character 21, is placed on the top 22 of automobile 11 and the downwardly extending support band 15 is placed so that its first end 23 extends over the top 16 of door 17 and, more specifically, of window 24. The first end 23 of band 15 has a dowel 25 sewn therein. This provides a thickened portion which will not permit the support band 15 to slide out of its grip between the top 16 of the door 17 and the gasket 26. Band 15 slides downwardly under the weight of pads 12, 13 and 14 until dowel 25 contacts the inner edge of the door and window assembly. Dowel 25 may be a wooden dowel, such as shown in FIG. 7, or a rope 27, such as shown in FIG. 6. The term, "dowel means," is used in a broad sense to include a thickened member held at the first end 23 of support band 15. Some automobile doors have a window which is the uppermost part of the door and window assembly as shown in FIG. 4. Others have a door portion 29 which is the uppermost portion of the door and window assembly as shown in FIG. 5. In either event, the uppermost portion of the door and window assembly contacts gasket 26.

It can be seen by viewing FIG. 3 that the protective pad of the present invention can be folded into a very compact configuration and readily stored, as for instance, behind the seat of the automobile. The pads 18, 19 and 20 are, preferably, about two feet square and the downwardly extending support band 15 is preferably about one foot wide at its first end 23 and flared outwardly to be about two feet wide at its second end which is indicated generally by reference character 28.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An automobile side protector for guarding one side of an automobile against dents and scratches from adjacent automobile doors and other sources, said protector being held by the door and window assembly of an automobile, said protector comprising:
    an automobile window and door assembly having a top edge abutting gasket means;
    a support band having a first end and a second end and having dowel means held at the first end thereof, said dowel means comprising a generally cylindrical member held by said support band and said support band being positioned adjacent the top edge of said automobile window and door assembly and said dowel being adjacent the gasket means and the inner surface of the window and door assembly; and
    at least one protective pad held at the second end of said support band so that the protective pad is extendable downwardly a sufficient distance to extend about to the rocker panel of the automobile to be protected and said protective pad extending forwardly and rearwardly away from said support band.

2. The automobile side protector of claim 1 wherein said support band holds a forward protective pad and a rearward protective pad.

3. The automobile side protector of claim 2 wherein the protector is a readily foldable protector and wherein said support band is about two feet wide at its lowermost point, and said pad is about two feet wide so that said forward pad may be folded rearwardly, and said rearward pad may be folded forwardly to provide a folded configuration of minimal size.

4. The automobile side protector of claim 2 wherein said band is about one foot in width at the first end thereof and extends outwardly to a width of about two feet at the second end thereof, and the forward and rearward protective pads have a width of about two feet at the tops thereof and extend downwardly to about two feet.

5. The automobile side protector of claim 1 wherein said dowel means comprises a length of rope.

6. The automobile side protector of claim 1 wherein said dowel means comprises a length of wooden dowel.

7. A method of protecting one side of an automobile with a protective pad assembly having a support band including dowel means at a first end thereof and protective pad means at the second end thereof, said method comprising:
    placing the entire protective pad assembly on the top of the automobile to be protected with the band extending inwardly:
    opening one of the doors of the automobile and inserting the first end of the support band over the edge of the opening so that the dowel means thereof extends below the door opening;
    closing the door which is open against the band whereby the dowel means of the band is captured by the edge of the door or window; and
    unfolding the pad assemblies and allowing it to hang downwardly along one side of the vehicle.

* * * * *